(12) United States Patent
Stillwell (10) Patent No.: US 8,051,598 B2
(45) Date of Patent: Nov. 8, 2011

(54) UNIVERSAL DECOY SYSTEM

(75) Inventor: Dennis Stillwell, Indian Valley, VA (US)

(73) Assignee: Expedite International, Hudson, WI (US)

( * ) Notice: Subject to any disclaimer, the term of this patent is extended or adjusted under 35 U.S.C. 154(b) by 0 days.

(21) Appl. No.: 11/879,604

(22) Filed: Jul. 18, 2007

(65) Prior Publication Data

US 2008/0060249 A1    Mar. 13, 2008

Related U.S. Application Data

(60) Provisional application No. 60/831,742, filed on Jul. 18, 2006.

(51) Int. Cl.
*A01M 31/06* (2006.01)
(52) U.S. Cl. ............................................................. 43/2
(58) Field of Classification Search .................... 43/2, 3
See application file for complete search history.

(56) References Cited

U.S. PATENT DOCUMENTS

| | | | | |
|---|---|---|---|---|
| 1,804,306 | A * | 5/1931 | Bender | 43/3 |
| 2,663,108 | A * | 12/1953 | Dixon et al. | 43/3 |
| 2,747,314 | A * | 5/1956 | McGregor | 43/3 |
| 2,835,064 | A * | 5/1958 | Webb | 43/3 |
| 3,172,223 | A * | 3/1965 | Stager | 43/2 |
| 3,557,436 | A * | 1/1971 | Hodes | 446/370 |
| 3,921,331 | A * | 11/1975 | Schatz | 446/297 |
| 4,862,625 | A * | 9/1989 | Dolan | 446/397 |
| 4,931,029 | A * | 6/1990 | Hwang | 446/396 |
| 4,934,088 | A * | 6/1990 | Pine et al. | 43/2 |
| 5,029,408 | A * | 7/1991 | Smith | 43/1 |
| 5,100,360 | A * | 3/1992 | Entzel | 446/169 |
| 5,233,780 | A * | 8/1993 | Overholt | 43/2 |
| 5,239,587 | A * | 8/1993 | Muckelrath | 381/56 |
| 5,289,654 | A * | 3/1994 | Denny et al. | 43/2 |
| 5,459,958 | A * | 10/1995 | Reinke | 43/2 |
| 5,555,664 | A * | 9/1996 | Shockley | 446/397 |
| 5,572,592 | A * | 11/1996 | Muckelrath | 381/56 |
| 5,802,197 | A * | 9/1998 | Fulcher | 446/397 |
| 5,832,649 | A * | 11/1998 | Kilgore | 43/2 |
| 5,964,054 | A * | 10/1999 | Galfidi, Jr. | 446/397 |
| 6,212,816 | B1 * | 4/2001 | Babbitt et al. | 43/3 |
| 6,385,895 | B1 * | 5/2002 | Scaries | 43/2 |
| 6,658,782 | B2 * | 12/2003 | Brint | 43/2 |
| 6,708,440 | B2 * | 3/2004 | Summers et al. | 43/2 |
| 6,757,574 | B2 * | 6/2004 | Gardner et al. | 700/94 |
| 7,076,909 | B2 * | 7/2006 | Heinn et al. | 43/2 |
| 7,082,710 | B1 * | 8/2006 | Jorgenson | 43/2 |
| 7,086,193 | B1 * | 8/2006 | Hurst | 43/2 |
| 7,124,532 | B1 * | 10/2006 | Ellis | 43/2 |
| 7,133,528 | B2 * | 11/2006 | Stilwell | 446/397 |
| 7,137,221 | B2 * | 11/2006 | Highby et al. | 43/2 |
| 7,287,352 | B1 * | 10/2007 | Kirby | 43/2 |
| 7,671,749 | B2 * | 3/2010 | Alvarado | 43/2 |
| 7,690,146 | B2 * | 4/2010 | Jong et al. | 43/2 |
| 7,884,730 | B2 * | 2/2011 | Alvarado | 43/2 |
| 7,958,666 | B2 * | 6/2011 | Rogers | 43/2 |
| 2002/0069572 | A1 * | 6/2002 | Price et al. | 43/3 |
| 2002/0100206 | A1 * | 8/2002 | Brint | 43/2 |
| 2003/0196367 | A1 * | 10/2003 | Powell | 43/3 |
| 2004/0031185 | A1 * | 2/2004 | Summers et al. | 43/2 |
| 2004/0194365 | A1 * | 10/2004 | Summers et al. | 43/43.2 |

(Continued)

*Primary Examiner* — Darren W Ark
(74) *Attorney, Agent, or Firm* — Skinner and Associates (57) ABSTRACT

A universal decoy includes a base, a stake attached to and extending vertically from the base, and a decoy attached to the upward end of the stake. The decoy has a sound system and a decoy movement mechanism.

3 Claims, 6 Drawing Sheets

U.S. PATENT DOCUMENTS

| | | | |
|---|---|---|---|
| 2006/0143968 A1* | 7/2006 | Brint et al. | 43/2 |
| 2007/0039227 A1* | 2/2007 | Highby et al. | 43/2 |
| 2008/0172920 A1* | 7/2008 | Brint et al. | 43/2 |
| 2009/0188148 A1* | 7/2009 | Orris et al. | 43/3 |
| 2009/0229164 A1* | 9/2009 | Bradley | 43/2 |
| 2009/0260273 A1* | 10/2009 | Rogers | 43/2 |
| 2009/0260274 A1* | 10/2009 | Rogers | 43/2 |
| 2010/0139146 A1* | 6/2010 | Elpi | 43/3 |
| 2010/0186280 A1* | 7/2010 | Dunkin | 43/2 |
| 2011/0113672 A1* | 5/2011 | Holmberg | 43/2 |

* cited by examiner

UNIVERSAL DECOY SYSTEM

CROSS-REFERENCE TO RELATED APPLICATIONS, IF ANY

This application claims the benefit under 35 U.S.C. §119 (e) of co-pending U.S. Provisional Patent Application Ser. No. 60/831,742, filed Jul. 18, 2006, which is hereby incorporated by reference.

37 C.F.R. §1.71(e) AUTHORIZATION

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to decoys. Particularly, the invention relates to an automated decoy system.

2. Background Information

The existing decoy technology and products are believed to have significant limitations and shortcomings. A need therefore exists for the present invention.

All US patents and patent applications, and all other published documents mentioned anywhere in this application are incorporated by reference in their entirety.

BRIEF SUMMARY OF THE INVENTION

The invention provides a decoy system, apparatus and method which is practical, reliable, accurate and efficient, and which is believed to fulfill the need and to constitute an improvement over the background technology.

In one aspect, the invention provides a decoy apparatus including a housing; a movement assembly communicatively connected to the housing; and a sound assembly connected to the housing.

In another aspect, the invention provides a decoy apparatus including a housing including a base for contact with an external surface; a movement assembly communicatively connected to the housing, the movement assembly comprising a motor connected to the housing, a power supply connected to the motor, a stake attached to and extending from the motor, outside the base, and a furry decoy element connected to the extended end of the stake; and a sound assembly connected to the housing, the sound system comprising a sound generator connected to the base, the power supply connected to the sound generator, and a speaker connected to the sound generator, wherein the decoy apparatus functions by taking a pulse sent to an external speaker and creating a electrical pulse to a motor which in returns moves, preferably by spinning, the decoy element.

In a further aspect, the invention provides a decoy method including the steps of generating a sound adapted to attract an animal, and simultaneously moving a decoy element adapted to attract the animal.

An in yet a further aspect, the invention provides a decoy method wherein the sound and motion generation are implemented by an apparatus including:
 a. a housing including a base for contact with an external surface;
 b. a movement assembly communicatively connected to the housing, the movement assembly comprising a motor connected to the housing, a power supply connected to the motor, a stake attached to and extending from the motor, outside the base, and a furry decoy element connected to the extended end of the stake; and
 c. a sound assembly connected to the housing, the sound system comprising a sound generator connected to the base, the power supply connected to the sound generator, and a speaker connected to the sound generator, wherein the decoy apparatus functions by taking a pulse sent to an external speaker and creating a electrical pulse to a motor which in returns moves, preferably by spinning, the decoy element.

The aspects, features, advantages, benefits and objects of the invention will become clear to those skilled in the art by reference to the following description, drawings, and claims.

DETAILED DESCRIPTION

The invention provides a universal decoy including a base, a stake attached to and extending substantially vertically upwardly from the base, and a decoy attached to the upward or distal end of the stake. The decoy has a sound system and a decoy movement mechanism.

In a preferred embodiment, the decoy system 10 functions by taking a pulse sent to an external speaker 11 and creating a electrical pulse to a motor 12 which in returns moves, preferably by spinning, a decoy 13, preferably a furry decoy.

The decoy 13 is disposed at the top end of stake 14 which extends from housing 15. Motor 12 is communicatively coupled to the stake 14 and to a PCB 16 which contains the circuitry of the system 10

It is believed that there are numerous decoy systems in use in the US and other countries that have external speaker jacks. The device and method of this invention are useable with such existing systems, if they have the external speaker option.

Components of the preferred embodiment of the apparatus of the invention include:

Batteries, preferably four (4) AA type batteries, to run a motor.
(1) expandable stake
(1) Furry Decoy
(1) Direct drive Motor
(1) Housing
Speaker cord, preferably 50 feet.

Figure 1A:
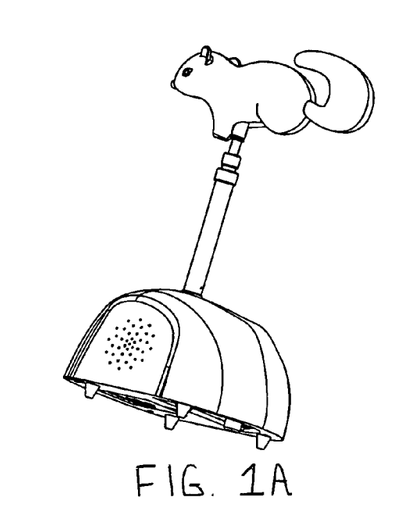
FIG. 1a illustrates an embodiment of the decoy system of the present invention.
Figure 1B:
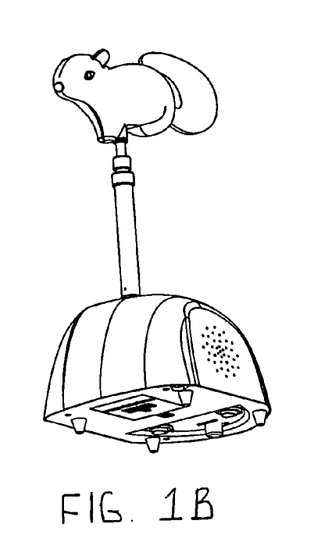
FIG. 1b is an isometric view of the decoy system.
Figure 1C:
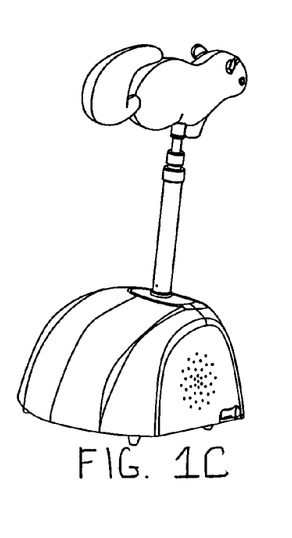
FIG. 1c is an isometric view of the decoy system.
Figure 1D:
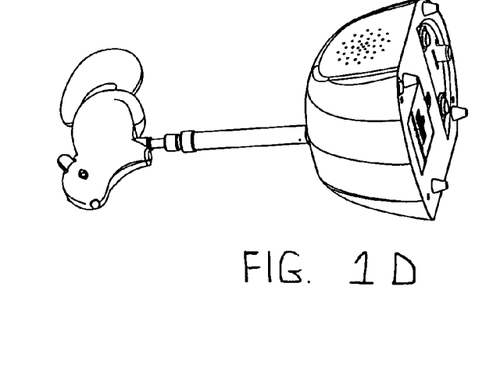
FIG. 1d is an isometric view of the decoy system.
Figure 1E:
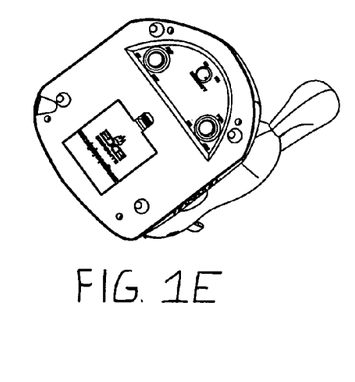
FIG. 1e is an isometric view of the decoy system.
Figure 1F:
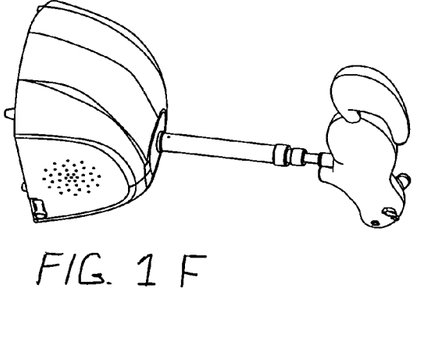
FIG. 1f is an isometric view of the decoy system.
Figure 2:
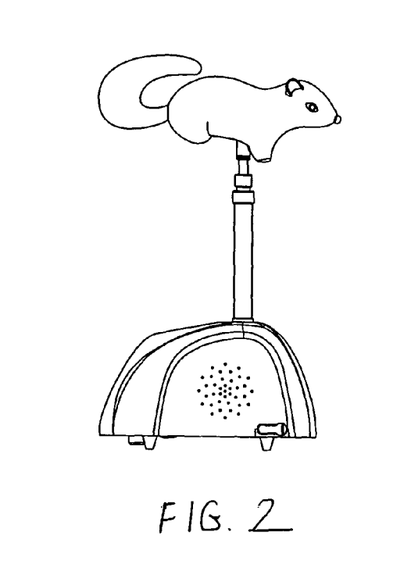
FIG. 2 is a detailed illustration of the decoy system.
Figure 3:
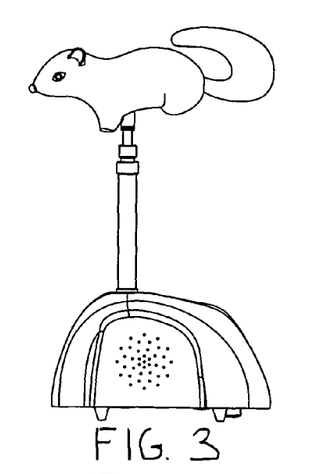
FIG. 3 is a front view of the decoy system.
Figure 4:
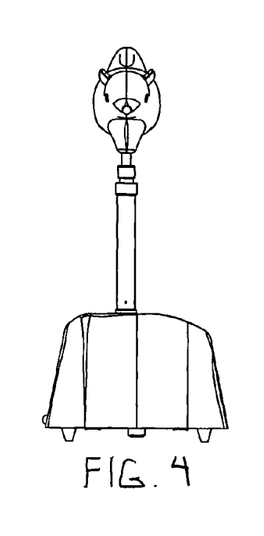
FIG. 4 is a left side view of the decoy system.
Figure 5:
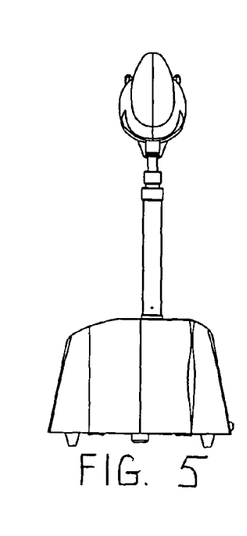
FIG. 5 is a right side view of the decoy system.
Figure 6:
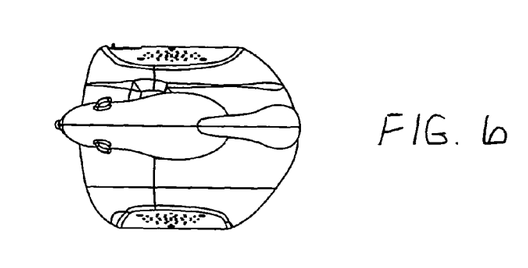
FIG. 6 is a top view of the decoy system.
Figure 7:
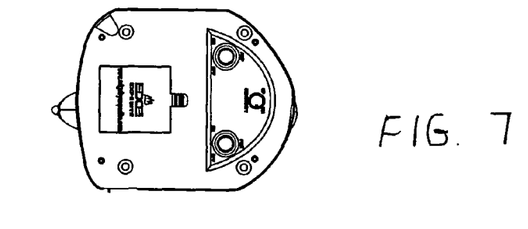
FIG. 7 is a bottom view of the decoy system.
Figure 8:
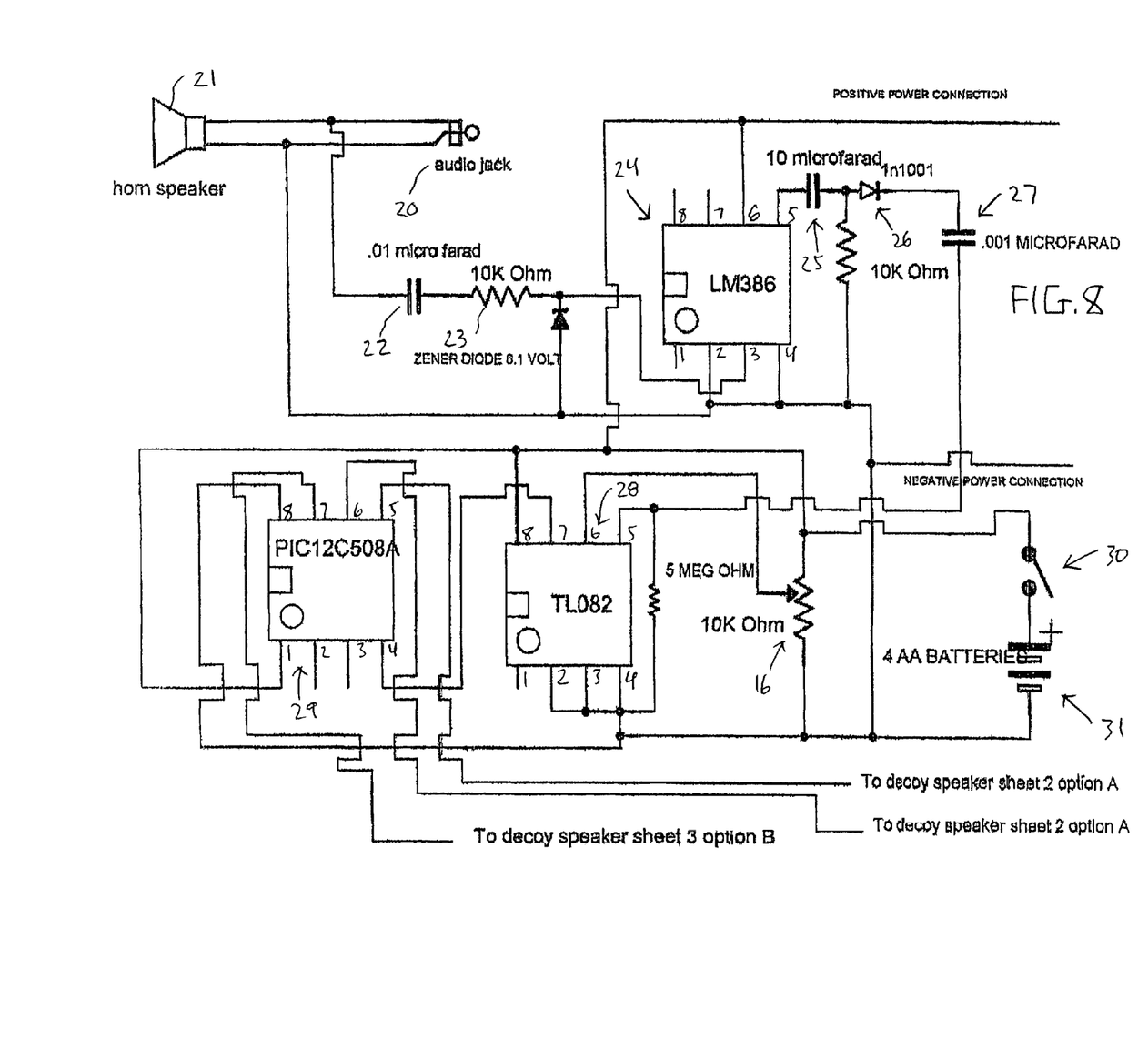
FIG. 8 is a schematic diagram of an embodiment of a portion of the electrical components of the decoy system.
Figure 11:
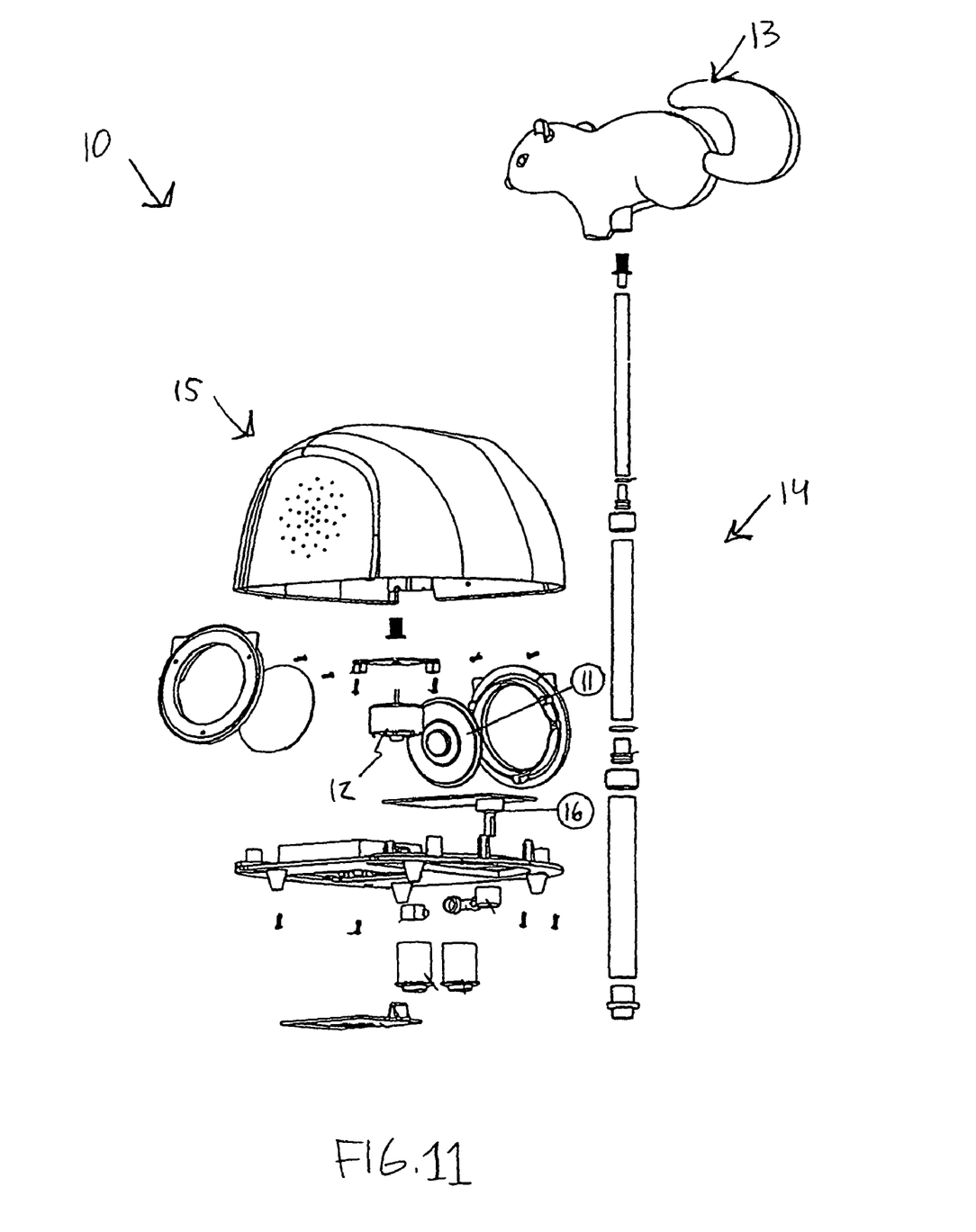
FIG. 11 is an exploded view of the decoy system.

These components are constructed and arranged as shown in the drawing figures. Referring to FIG. 11, the printed circuit board (PCB) 16 of the system 10 functions by playing an audio signal from a sound source such as a compact disc player or electronic animal and delivering it to the Universal Decoy system 10 by plugging an audio cord from the sound source in to an audio jack 20. The sound passes through the Universal Decoy system 10 to speaker 21 to play the sound. Referring to FIG. 8, a sample of the audio signal at jack 20 is coupled through capacitor 22 and through resistor 23 to input 3 of LM386 audio amplifier 24. The amplified audio signal is coupled through a 10 micro farad capacitor 25 and then rectified by a diode 27. The rectified signal is then coupled through a .001 micro farad capacitor to the positive input 5 and TL082 OP AMP 28. The AMP 28 is configured to operate as a comparator. In this configuration the negative input pin 6 of AMP 28 is connected to a reference voltage source supplied by potentiometer 16. The potentiometer 16 is adjusted by the user to trigger at a desired sound level. When the voltage on the positive input 5 on the AMP 28 is at a lower voltage level than the negative input 6 on AMP 28 the output 7 on the AMP 28 is in its low state or 0 volts. When the voltage on the positive input 5 on the AMP 28 is at a higher voltage level then the negative input 6 on the AMP 28 the output of pin 7 on the AMP 28 is in its high state or +5 volts. Output 7 of the AMP 28 is connected to pin 4 of a MicroChip PIC12C508 microcontroller 29. The microcontroller 29 pin 4 as an input, and pins 5, 6 and pin 7 are outputs. Microcontroller 29 also has an on board 8 bit free running timer/counter. In this mode the timer/counter will continuously count to 255 and recycle to 0 and repeat continuously. When the microcontroller 29 receives a 0 volts signal on input 4 from the AMP 28 output 7, the microcontroller 29 places 0 volts on outputs 5-7.

Figure 9:
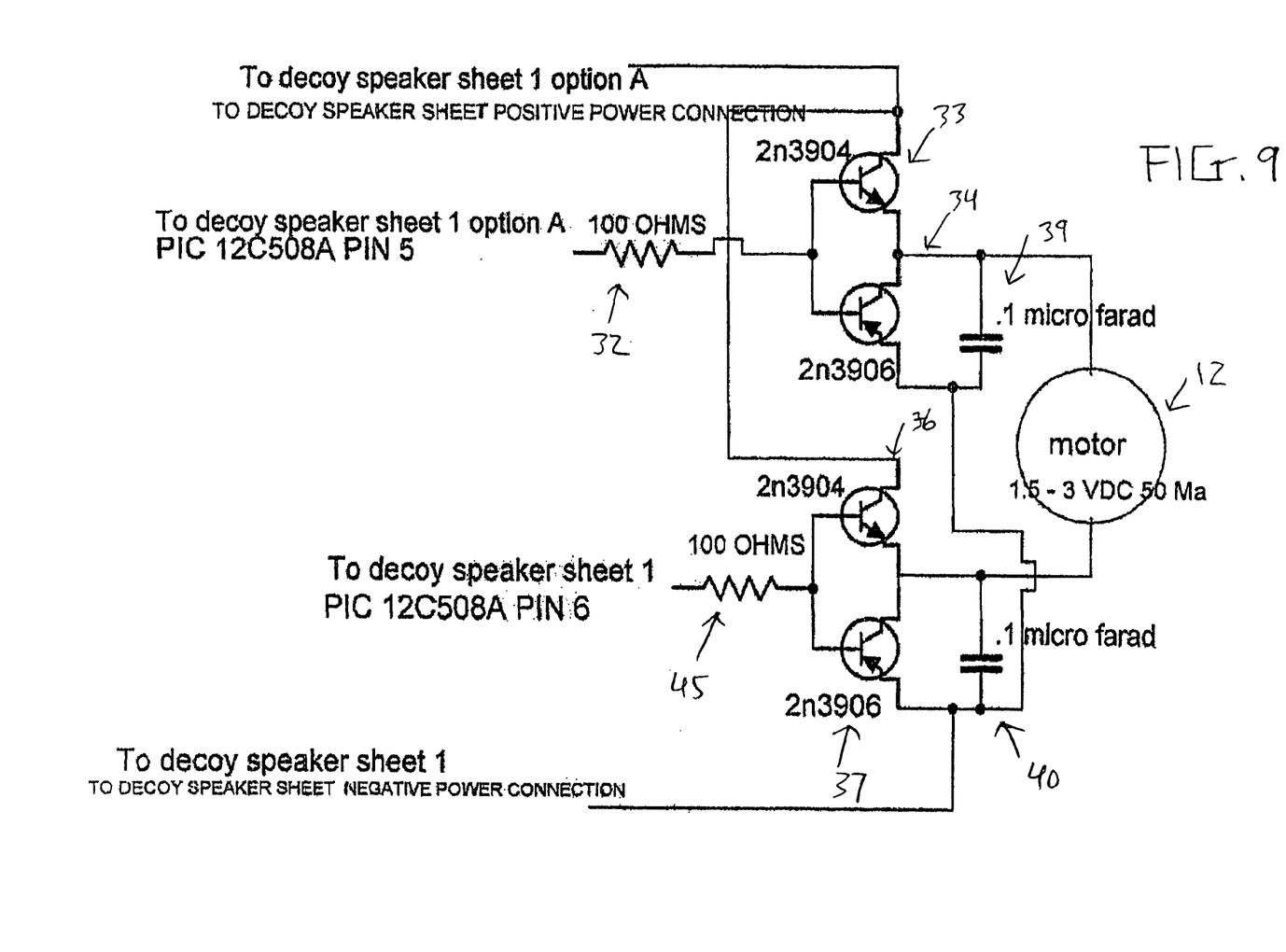
FIG. 9 is a schematic diagram of an embodiment of speaker components of the electrical system for use with the components of FIG. 8.

Referring also to FIG. 9, microcontroller 29 output 6 is connected to resistor 45 which in turn is connected to the base of a PNP transistor 34 and also to the base on a NPN transistor 33. The Emitter of NPN transistor 33 is connected to the collector of PNP transistor 34 and to lead 1 of motor 12. The collector NPN transistor 33 is connected to the +5 volt from battery 31. The emitter of PNP transistor 34 is connected to the negative side of battery 31. The microcontroller 29 output 5 is connected to resistor 32, which in turn is connected to the base of a PNP transistor 37 and also to the base on a NPN transistor 36. The Emitter of NPN transistor 36 is connected to the collector of PNP transistor 37 and to lead 2 of motor 12. The collector NPN transistor 36 is connected to the +5 volt from the Battery 31. The emitter of PNP transistor 37 is connected to the negative side of battery 31.

Figure 10:
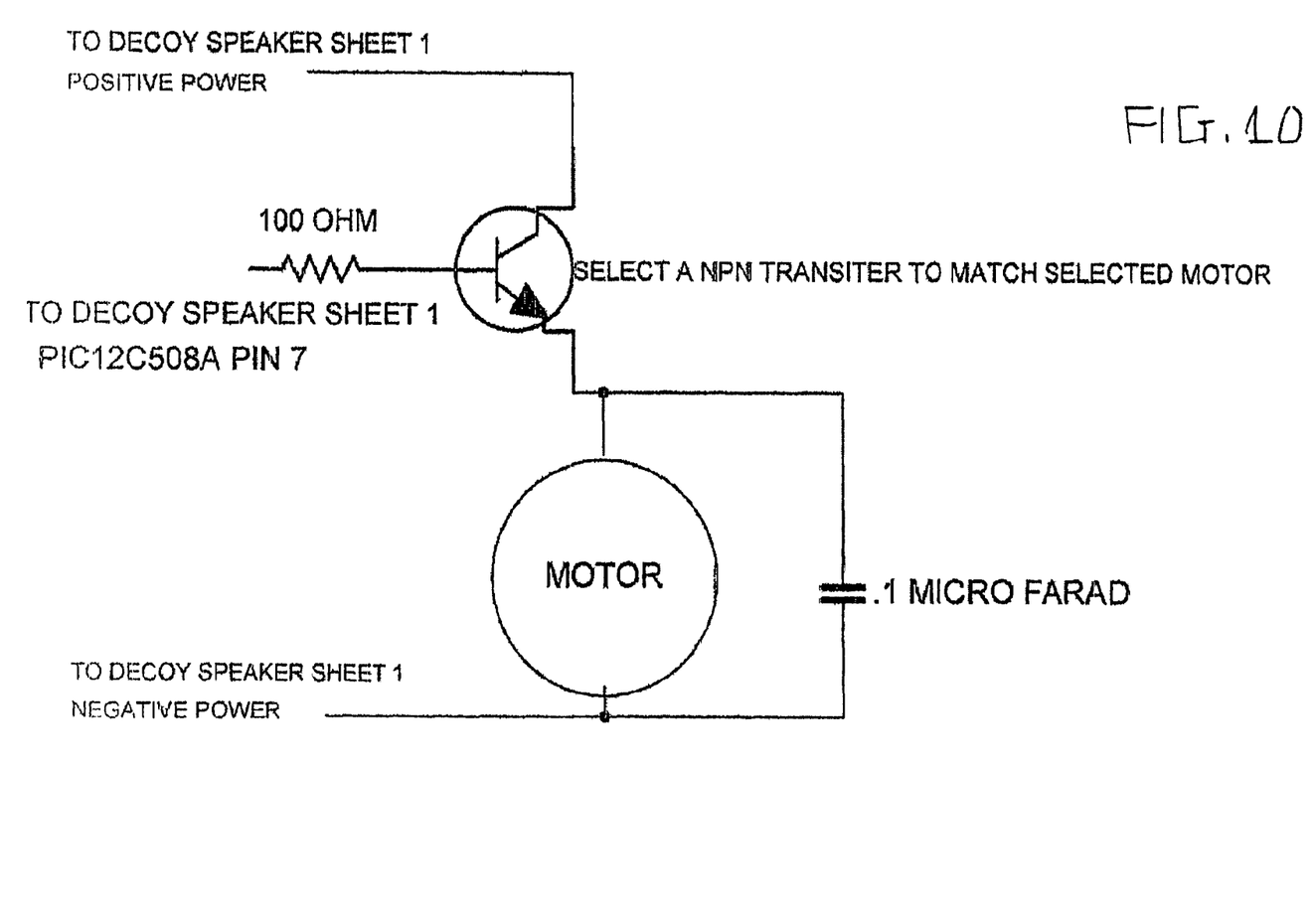
FIG. 10 is a schematic diagram of an alternative embodiment of speaker components of the electrical system for use with the components of FIG. 8.

The four transistors 33, 34, 36, 37 and motor 12. form an H-Bridge. When 0 volts is applied to resistor 32 and 0 volts is applied to resistor 45 the two NPN transistors 33 and 36 are reverse biased (turned off) and two PNP transistors 34 and 37 are forward biased (turned on). This places lead 1 and lead 2 of motor 12 at 0 volts turning it off. When +5 volts is applied to resistor 32 and 0 volts is applied to resistor 45. NPN transistor 33 is forward biased (turned on) placing +5 volts on lead 1 on motor 12 and PNP transistor 37 is forward biased, ground (0 volts) on lead 2 of motor causing the motor 12 to turn in one direction. When +5 volts is applied to resister 45 and 0 volts is applied to resister 32. NPN transistor 36 is forward biased (turned on) placing +5 volts on lead 2 on motor 12 and PNP transistor 34 is forward biased, ground (0 volts) on lead 1 of motor 12 causing the motor 12 to turn in opposite direction. When the signal voltage on the positive input 5 on the AMP 28 is lower then the reference voltage on the negative input 6, the output 7 is 0 volts. This 0 volt signal is connected to microcontroller 29 input 5. In this condition outputs 5 and 6 are at 0 volts. When the signal voltage on the positive input 5 on the AMP 28 is lower then the reference voltage on the negative input 6 the output 7 is +5 volts. The +5 volts on input 4 of the microcontroller 29 will cause it to place +5 volts on output 6 and a 0 volt on output 5. The +5 volts on output 6 of microcontroller 29 will forward bias NPN transistor 36. The 0 volts will forward bias PNP transistor 34. This will turn on the motor 12. After the motor 12 is on, the microcontroller 29 retrieves the value from it's on board free running timer/counter and loads it in a count down. Once the count down has expired, the microcontroller 29 checks input 4 to see if it is still at +5 volts. If so, it places 0 volts on output 6 and +5 volts on output 5. This forward biases PNP 37 and NPN transistor 33. This reverses the motor 12. The microcontroller 29 then loads the new count from the free running timer/counter and repeats the process. If the input 4 is at 0 volts, it turns off output pins 5, 6 and scans input 4 for the next +5 volts. When the microcontroller 29 detects a +5 volt this also sets output 7 to +5 volts this signal can control an optional motor shown in FIG. 10.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A portable, compact and lightweight external animal decoy apparatus for use with a separate, base animal decoy system having an external speaker jack, comprising:
   a. a portable, compact and lightweight housing including a base for contact with an external surface;
   b. a decoy movement assembly connected to the housing and communicatively connectable to the external speaker jack, the decoy movement assembly comprising a motor connected to the housing and communicatively connectable to the external speaker jack of the decoy system, a battery power supply communicatively connected to the motor, a comparator, and a transistor H-bridge, the decoy movement assembly further including a drive stake extending upwardly from and outside the housing and having an upwardly extended end, and a decoy element connected to the upwardly extended end of the drive stake such that the decoy element is held apart and separated from the housing for spinning movement and visualization by attracted animals;

c. a speaker connected to the housing and communicatively connectable to the external speaker jack; and wherein the external animal decoy apparatus functions by receiving a series of pulses sent from the external speaker jack of the base decoy system and creating sounds at the speaker and creating a series of electrical pulses to the decoy movement assembly which in turn moves the decoy movement assembly and spins the decoy element in time with the sound.

2. The decoy apparatus of claim 1, wherein the power supply comprises at least one battery.

3. The decoy apparatus of claim 1, wherein the decoy element is a furry article.

* * * * *